United States Patent [19]

Juergens

[11] Patent Number: 5,368,961

[45] Date of Patent: * Nov. 29, 1994

[54] THIN PLATE ELECTROCHEMICAL CELL

[75] Inventor: Tristan E. Juergens, Blackhawk, Colo.

[73] Assignee: Bolder Battery, Inc., Wheatridge, Colo.

[*] Notice: The portion of the term of this patent subsequent to Sep. 10, 2008 has been disclaimed.

[21] Appl. No.: 74,933

[22] Filed: Jun. 10, 1993

Related U.S. Application Data

[63] Continuation-in-part of Ser. No. 945,805, Sep. 16, 1992, which is a continuation-in-part of Ser. No. 757,447, Sep. 10, 1991, Pat. No. 5,198,313, which is a continuation-in-part of Ser. No. 366,867, Jun. 14, 1989, Pat. No. 5,047,300.

[51] Int. Cl.$^5$ ............................................. H01M 4/66
[52] U.S. Cl. ..................................... 429/233; 429/245; 429/94; 29/623.1
[58] Field of Search ......................... 429/233, 245, 94; 29/623.1

[56] References Cited

U.S. PATENT DOCUMENTS

| | | | |
|---|---|---|---|
| 3,819,414 | 6/1974 | Taylor | 429/245 X |
| 4,140,840 | 2/1979 | Ruben | 429/245 X |
| 4,170,470 | 10/1979 | Marshall et al. | 429/245 X |
| 4,346,153 | 8/1982 | Rigal et al. | 429/245 X |
| 4,411,969 | 10/1983 | Sundberg | 429/50 |
| 4,769,299 | 9/1988 | Nelson | 429/57 |
| 5,047,300 | 9/1991 | Juergens | 429/94 |

*Primary Examiner*—Stephen Kalafut
*Attorney, Agent, or Firm*—Beaton & Swanson

[57] ABSTRACT

An electrochemical cell and method for producing the same having superior recharge and discharge characteristics through the use of thin non-perforated lead films.

31 Claims, 2 Drawing Sheets

THIN PLATE ELECTROCHEMICAL CELL

This is a continuation-in-part of application Ser. No. 07/945,805 filed Sep. 16, 1992 which is a continuation-in-part of application Ser. No. 07/757,447 filed Sep. 10, 1991, issued as U.S. Pat. No. 5,198,313 on Mar. 30, 1993, which is a continuation-in-part of application Ser. No. 07/366,867 filed Jun. 14, 1989 and issued on Sep. 10, 1991 as U.S. Pat. No. 5,047,300.

FIELD OF THE INVENTION

This invention relates to an apparatus and method for manufacture of electrochemical cells having superior recharge and discharge capabilities. Such electrochemical cells are comprised of ultra-thin plates and separators within a container.

BACKGROUND OF THE INVENTION

There have been dramatic improvements in the design and performance characteristics of compact hermetically sealed rechargeable electrochemical cells. These cells are typically configured either as a series of plates or in a spirally wound electrode assembly. The two commonly used chemical systems are the lead acid system and the nickel cadmium system.

Although the lead acid battery system has been known and utilized for many decades, solutions to many of the practical difficulties associated with using such cells were not proposed until the mid-1970s. One of the difficulties seen with early lead acid cells was related to the problem of keeping the electrolyte acid contained within the cell. It was necessary to maintain an excess amount of acid (sulfuric acid) in the cell in order to allow for overcharging of the electrodes during the recharge process. Overcharging leads to the production of hydrogen and oxygen within the cell which traditionally was vented from the cell. Electrochemical cells having vent means and free acid generally had to be held upright in order to prevent the acid from leaking from the cell.

An additional problem with traditional lead acid cells was in maintaining the physical characteristics of the lead plates within the cell. In order to put some "back bone" in the lead plates, lead containing up to one percent of calcium was often used in cells to give the plates some rigidity.

The breakthrough invention in lead acid cells is described in U.S. Pat. No. 3,862,861 of McClelland et al. The McClelland patent discloses the incorporation of several elements that combine to alleviate each of these problems associated with the traditional lead acid cell. The McClelland invention recognized the potential of utilizing the electrochemical recombination reaction. By capitalizing on the "oxygen cycle", a lead acid cell could be produced such that the electrolyte could be maintained in a "starved" condition. Rather than having an excess of electrolyte, the cell could be operated with a minimal amount of electrolyte present in the system. In order to maintain a starved condition, it is necessary to have sufficient absorbent material or pores within the cell to contain the electrolyte while still having space filled with gas.

By using relatively absorptive separator material, McClelland was able to accomplish two distinct functions. The absorptive separator allowed the flow of gases and electrolyte between the positive and negative plates, thereby allowing the oxygen cycle to function. The absorptive separator also acts as a wick to hold the electrolyte within the cell without the necessity of having free electrolyte in the system.

McClelland also discloses a configuration of the plates and separator so that the elements are held tightly together. It was then possible to use considerably purer lead grids that are more corrosion resistant than the calcium-containing lead plates previously used. Venting means are included in the McClelland device as a safety release device to release excess pressure. However, since there is little or no non-absorbed electrolyte in the cell, there is almost no danger of acid leaking from the cell.

Prior to the development of the McClelland device, U.S. Pat. Nos. 3,395,043 and 3,494,800 of Shoeld disclosed the use of relatively thin lead plates in an electrochemical cell. The cells described in the Shoeld patents, being prior in time to the McClelland patent, did not use absorptive, gas permeable separators. The cells disclosed did not, therefore, utilize the oxygen cycle, were not maintained in a starved or semi-starved condition, and probably contained free electrolyte in order to function properly. The Shoeld patents do not indicate that the batteries produced would have superior discharge or recharge characteristics. Based on the techniques and materials available at the time of the Shoeld disclosures, it is quite unlikely that the cell disclosed therein would have had any significant advantages over existing cells.

Since the McClelland patent, there have been several patents disclosing improvements to the fundamental cell disclosed therein. In the field of using blind rivets to assemble an electrochemical cell and to act as an electrical conductor, there is U.S. Pat. No. 3,704,173 by McClelland, et al. U.S. Pat. Nos. 4,465,748 of Harris, 4,414,259 of Uba, 4,233,379 of Gross, 4,137,377 of McClelland and 4,216,280 of Kono each describe separators to be used in starved lead acid cells. U.S. Pat. Nos. 4,725,516 of Okada and 4,648,177 of Uba both identify cell parameters that lead to superior recharge/discharge characteristics in lead acid cells.

U.S. Pat. No. 4,769,299 of Nelson to a certain extent incorporates the inventions of Shoeld and McClelland. The Nelson patent describes the use of grid-like plates and absorptive gas permeable separators as described in McClelland with the extremely thin plates disclosed by Shoeld. The result is a lead acid cell with enhanced recharge/discharge properties.

The theoretical advantage of utilizing thin plates in electrochemical cells has been known for decades. The thinner the plates the less distance electrons have to travel within the plate during discharge, and, during recharge, the shorter distance of non-conductive material to be regenerated. To a certain extent, the thickness of plates utilized has been dictated by the available technology for the production and handling of thin lead films.

U.S. Pat. No. 5,045,415 by Witehira describes a lead-acid battery with extremely thin plates on the order of 5 to 20 micrometers thick (less than 0.001 inches). However, the plates are not interleafed negative and positive plates, but instead are sandwiched together to form thicker plates which, in turn, are interleafed.

U.S. Pat. No. 4,173,066 by Kinsman is for a laminar battery having a zinc coated cellophane substrate. Of course, the function of a cellophane substrate and the manufacturing concerns associated with it are much different from those of a metal foil substrate. U.S. Pat.

No. 3,377,201 by Wagner is for a liquid electrolyte battery such as a lead-acid cell. One embodiment of the invention is a silver-zinc cell having a positive plate 0.010 inches thick but the negative plate is 0.025 inches thick. U.S. Pat. No. 3,023,260 by Coler is for a liquid electrolyte battery having an electrode with a thickness of 0.025 inches. U.S. Pat. No. 4,996,128 by Aldecoa is for a lead-acid battery having a foil thickness of "less than 0.010 inches". The porous paste thickness is not specified, but presumably is greater than the thickness of the foil, to make the total plate thickness in excess of 0.010 inches. Other references to so-called thin plate designs are U.S. Pat. Nos. 4,001,022 by Wheadon (referring to plates in excess of 0.010 thick) and 4,863,728 by Witehira (which describes the use of both thin plates and thick plates in a single battery to provide a variety of discharge characteristics).

The use of thin plates has been seen for some time in alkaline batteries such as nickel-cadmium batteries. For example, U.S. Pat. Nos. 4,963,161 by Chi, 4,937,154 by Moses and 4,539,272 by Goebel, describe alkaline batteries having thin plates. However, alkaline batteries normally are formed with plates of materials with higher tensile strengths than lead which are much easier than lead to manufacture and handle in thin layers.

For much the same reasons that thin plates produce superior results, thin layers of reactive paste also lead to superior discharge/recharge characteristics. The Nelson patent discloses the use of both thin lead grids and thin layers of reactive paste. A basic shortcoming in the Nelson device, is that the paste residing within the grid openings can have a greatly increased distance to the lead plate material. For example, in the Nelson patent the openings in the lead plate grid are constructed so that the distance from the center of the opening to the grid strands is significantly greater than the thickness of the paste layer on the face of the plate. Since the performance characteristics of electrochemical cells is proportional to the thickness of the lead plates and the thickness of the paste layer, the use of grids or other perforated sheets, greatly decreases the efficiency of the cells.

The Nelson patent teaches away from a thin plate design using non-perforated plates, on the grounds that thin plates are prone to corrosion:

"To achieve optimum high rate discharge capability, in theory one would prefer to use thinner plates to reduce the current density on discharge. However, corrosion, particularly at the positive grid as aforementioned, has placed limitations on how thin plates can be made in practice."

Other patents on thin perforated plates include U.S. Pat. Nos. 4,999,263 by Kabata (which refers to films as thin as 3 micrometers coated with a polymeric material having a thickness of "1,000 micrometers or less"; 3,973,991 by Cestaro (referring to perforated lead foil 0.019 inches thick before the application of a coating); and 4,874,681 by Rippel (which refers to a woven perforated plate of strands with a 0.008 inch outside diameter or 0.005 inch outside diameter before application of any coating). Other art in the field includes U.S. Pat. Nos. 4,064,725 by Hug; 4,099,401 by Hug; 4,112,202 by Hug; 4,158,300 by Hug; 4,212,179 by Juergens; 4,295,029 by Uba; 4,606,982 by Nelson; 4,709,472 by Machida; 4,780,379 by Puester; Japanese Patent Nos. 58-119154 and 59-103282 and U.S.S.R. Patent No. 674124.

Of course, the prior art includes many references to thin plate capacitors. See, for example, U.S. Pat. No. 4,720,772 by Yamano. These patents are of marginal relevance, because they are not directed toward battery technology and the plate material is normally aluminum or nickel rather than lead.

SUMMARY OF THE INVENTION

The electrochemical cell of the present invention is characterized by the use of thin non-perforated positive and negative plates along with thin active material layers and thin absorptive separator material layers. In the optimum design, the cell is initially produced with an excess volume of electrolyte. Through processing, a volume of electrolyte is achieved in the cell, and the electrolyte volume is maintained, in an almost saturated condition with respect to the absorptive capacity of the separator and the electrode materials.

The cell of the present invention is characterized by an exceptionally high plate surface area to active material ratio. The cells are produced utilizing films of lead or nickel approximately 0.002 inches thick. The active material or paste maintained on the surface of both sides of the sheet are approximately 0.001 to 0.003 inches thick. The inter-plate spacing is 0.005 or more inches. In one preferred embodiment, both the negative plate and the positive plate are of substantially non-perforated sheets having the thickness described above. In another preferred embodiment, one plate is of the thickness described above while the other plate is significantly thicker. In yet another preferred embodiment, one plate (the corroding plate) is a substantially non-perforated sheet while the other plate is perforated.

When manufacturing lead acid cells, the active material may be sulfated lead pastes or PbO and $Pb_3O_4$ or leady oxide for the positive and PbO for the negative plates. When utilizing sulfated pastes, the specific gravity of the electrolyte is about 1.28. The lead films of the plates are preferably greater than 97% pure. If containing tin, the plates may be from about 0.50% to 2.5% tin. If tin is not used, the lead is approximately 99.99% pure.

Any number of separator materials known in the art may be utilized with the present invention. One suitable glass microfiber material consists of 90% of fibers of 1 to 4 microns in diameter and 10% of larger fibers existing as a woven or non-oriented mat. Examples of acceptable separator materials are described in U.S. Pat. Nos. 4,233,379 of Gross et al. and 4,465,748 of Harris.

The surface of the electrode films may be physically roughened to increase the adhesion of the thin layer of active material to the film surface and to further increase the surface area of the films. Alternatively, the films may be textured in the rolling process by using a textured roller.

The electrochemical cell of the present invention demonstrates dramatic improvements in recharge/discharge capabilities over prior art cells produced as described in the various references cited above. Maximum current capabilities are increased and the current value remains at near its maximum throughout a longer period of its discharge profile. Recharge times are also reduced dramatically. Recharge can be accomplished at currents up to 10 C (or ten times the amp hour rating of the cell).

DESCRIPTION OF THE PREFERRED EMBODIMENTS

According to the present invention, an electrochemical cell having both excellent charge and discharge characteristics is described. Technological breakthroughs in the fields of thin film handling have made it possible to create high rate electrochemical cells that have performance characteristics that are unprecedented in the field.

Utilizing ultra-thin films of either lead (for lead acid systems) or nickel (for cadmium nickel systems) in combination with extremely thin layers of active material, it is possible to create cells that have very high utilization of the active material, even at extreme discharge rates. Therefore, even under extreme loads there is little voltage drop within the plates of the cell.

The present invention describes electrochemical cells with quite low plate current densities and low connector current densities, thereby reducing heat creation.

The electrochemical cell of the present invention is composed of ultra-thin films of an electrochemically active metal—generally lead or nickel—that is coated on each side with an electrochemically active paste. Preferably, the positive film (which is the corroding element) is substantially non-perforated while the negative film may be either perforated or non-perforated. One of the aspects of the present invention in a preferred embodiment is that there not be any active material paste at a distance of greater than 0.005 inches from the film on which it is coated. The positive and negative plates of the electrochemical cell are maintained apart from each other by separator material. The separator material also acts to absorb the electrolyte that is contained in the enclosed cell system.

Figure 1:
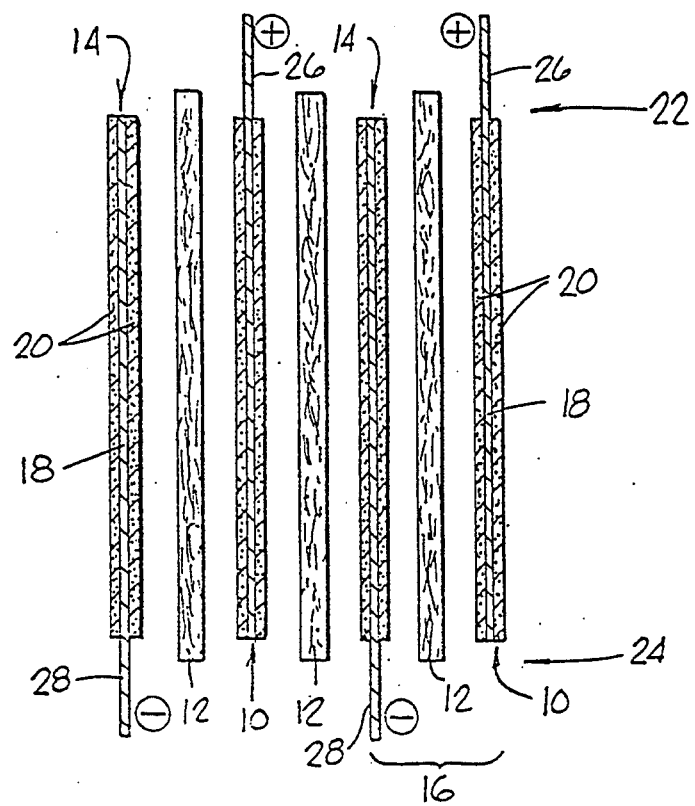
FIG. 1 is a diagrammatic vertical cross-sectional view of alternating positive and negative plates that are separated by layers of separator according to one embodiment of the present invention.

A diagrammatic view of a cell unit according to the present invention is seen in FIG. 1. Negative plate 14, separator 12 and positive plate 10 constitute an electrochemical unit cell 16. The negative plate 14, and optionally the positive plate 10, each consist of an ultra-thin film 18 of either lead or nickel partially coated on both major faces with a layer of a suitable electrochemically active paste 20.

According to the present invention, the films 18 utilized in the negative plate of the electrochemical cell are no greater than 0.005 inches thick. In the preferred embodiments, the negative films 18 are about 0.0015 to 0.0030 inches thick. In certain ways, the electrochemical cells of the present invention are constructed along the lines of standard electrolytic capacitors rather than standard batteries, in the sense that they employ extremely thin plates. Handling such thin films and incorporating the same into functional electrochemical cells was previously thought to be impossible.

Utilizing such thin films of active material, it is possible to greatly increase an important variable in such electrochemical cells, the ratio of surface area of film to the amount of active paste material. In the present invention, cells having greater than 26.0 square centimeters of surface area per gram of active material are described. In fact, in a preferred embodiment, there are up to 50 square centimeters per gram of active material.

A thin layer of the active material paste 20 is applied to a large portion of both major faces of the negative and positive films 18. Each layer is no more than 0.005 inches thick, and in the preferred embodiments of the invention, the layers of active material paste 20 are about 0.002 to 0.003 inches thick or less. The negative plate and, optionally, the positive plate, each have a total thickness of film plus paste of no more than 0.010 inches. In the preferred embodiment the thickness is about 0.005 to 0.008 inches, with an interplate spacing of about 0.005 or more inches. As used herein, the "plate" refers to the film together with the paste that is applied to the film, while the "film" refers to the film not including the applied paste. Thus, a film that is, for example, 0.002 inches thick and coated on both sides with a paste that is 0.001 inches thick, results in a total plate thickness of 0.004 inches.

In each unit cell 16, the negative plate 14, the separator 12 and the positive plate 10 are in a specific physical relation as seen in FIG. 1. Both major faces of the metal films 18 are coated with active material paste 20, except along alternating horizontal edges 26 and 28 where there is left a bare strip about a tenth inch wide. On the negative plate 14, the portions of the major faces 28 adjacent to the lower horizontal edge are not coated with the active material paste 20, and on positive plate 10, the portion of the major faces 26 adjacent to the upper horizontal edge are not coated with the active material paste 20.

The separator 12 extends beyond the coated portions of both the negative plate 14 and positive plate 10 in order to separate the plates effectively. However, the separator does not extend as far as the end of the uncoated portions 26 and 28 of the positive plate 10 and negative plate 14, respectively. Thus, those uncoated portions can receive the end connectors in the manner described below. The cell could, of course, be constructed so that the relative position of the positive and negative plates are reversed.

In an embodiment of the invention wherein a "D" size cell is produced, the negative and positive films 18 are each about 1.5 inches high. The uncoated ends extend about one-fourth inch beyond the coated plate of opposite polarity, and the separator 12 extends about one-eighth inch beyond the coating of each plate.

The surfaces of the film 18 that are to be coated may be textured by the rolling process prior to application of the active paste 20. The texturing may be accomplished in the rolling of the films by using a textured roller. This allows for a more adequate adhesion between the paste and the film.

Figure 2:
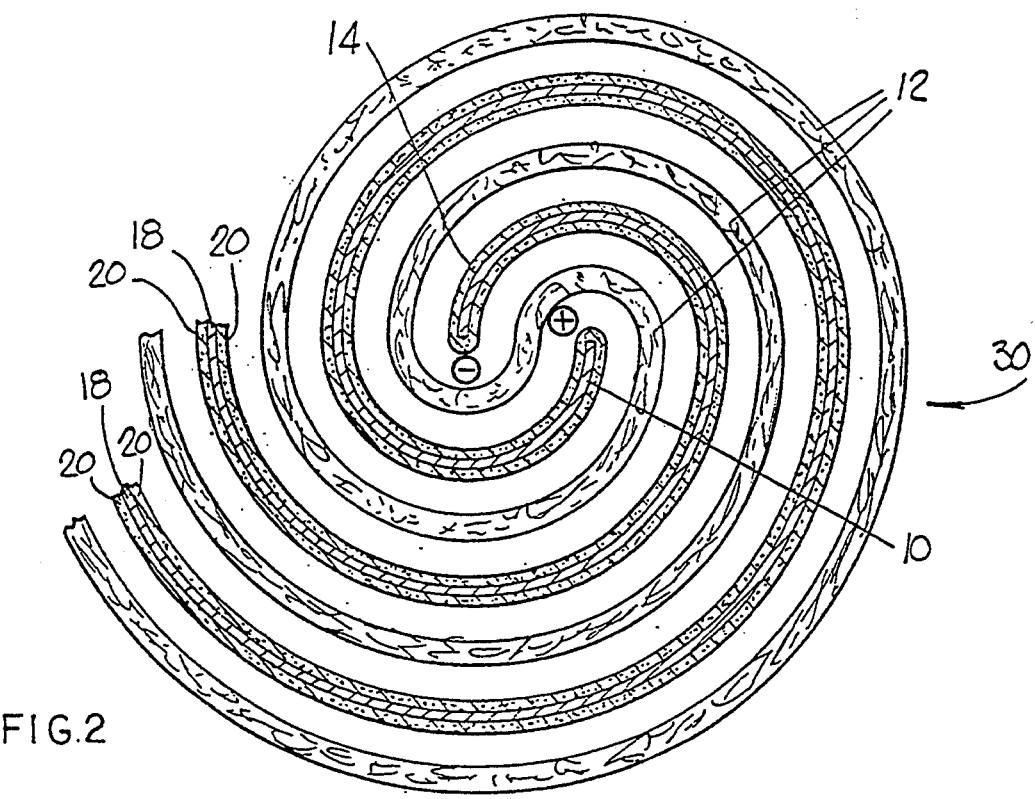
FIG. 2 is a diagrammatic horizontal cross-sectional view of a spirally wound cell unit according to one embodiment of the present invention.

In the preferred embodiment of the invention, the electrochemical cell is constructed of a single spirally wound unit cell as is shown in FIG. 2. Of course, the invention could also be employed utilizing parallel stacks of any number of unit cells. In the spirally wound configuration 30 of FIG. 2, a single continuous sheet of separator 12 may be employed to separate the negative 14 and positive 10 plates from each other.

A variety of systems are available for encasing the cell and for establishing electrical communication between the plates and exterior cell terminals. One system for establishing electrical communication between the plates and exterior cell terminals is described in U.S. Pat. Nos. 5,047,300 and 5,045,086, both by Juergens and assigned to the assignee of the present application. That system, as described in more detail in those patents, includes utilizing a negative film that extends beyond the positive film and the separator at one end and a positive film that extends beyond the negative film and separator at the other end. A positive end connector is applied to the end with the extending positive film, so that the positive film is bent radially inward to overlap itself and to thereby maximize the contact between the positive film and the positive end connector. Similarly, a negative end connector is applied to the end with the extending negative film, so that the negative film is bent radially inward to overlap itself and to thereby maximize the contact between the negative film and the negative end connector.

Another system for establishing electrical communication between the plates and exterior cell terminals is disclosed in U.S. Pat. No. 5,198,313, assigned to the assignee of the present application. That system employs a positive end connector that is cast onto the positive film extending from one end of the cell, and a negative end connector that is cast onto the negative film extending from the opposite end of the cell. As described in more detail in that patent, the end connectors are cast onto the extending films by immersing the extending films in molten metal at a temperature just high enough to maintain the metal molten but not high enough to melt the extending films, so that the molten metal solidifies onto the extending film to form end connectors with no discontinuities at the connection to the films.

The cell is encased in a way known in the art, such as by encasing it in a can of polypropylene, metal or other suitable material. Appropriate vent means should be provided to vent excess internal pressure.

For lead acid electrochemical cells, there are a number of widely known combinations of active material pastes that are typically used. Any of these commonly utilized systems would be appropriate for use with this invention. For example, sulfated PbO pastes used on both the positive and negative plates provide a satisfactory system, as does the use of PbO and $Pb_3O_4$ on the positive plate and PbO on the negative plate. The use of litharge, red lead or leady oxide is also possible. The important factor is that the active material paste 20 be of a nature so that it can be applied to the ultra-thin layer, as described above.

As is commonly seen in the new generation of the lead acid cells as exemplified in the McClelland and Nelson patents, the use of an absorbent, permeable separator, which permits gas transfer, it critical. As described above, there are several separator materials that have been disclosed for use specifically with lead acid system electrochemical cells. For the purposes of the present invention, any of the commonly used absorbent separators will work suitably. In one preferred embodiment, the separator is a glass micro-fiber which is about 95% porous in the uncompressed state and wherein 90% of the fibers are 1-4 microns in diameter.

When utilizing the lead acid system, the lead film 18, at least at the negative plate, may be about 97 to 99.99% pure, with the rest being tin or other metals. As described above, the lead film for each embodiment 18 is about 0.005 inches or less thick, and is preferably about 0.003 to 0.0015 inches thick.

When sulfated lead oxides are used as the active material paste, the specific gravity of the sulfuric acid electrolyte solution used is between 1.20 and 1.32. The type of vent used on the electrochemical cell may be similar to those described in the literature and known by those with ordinary skill in the art, and operates to vent excess gases when the internal pressure exceeds a certain level. Some internal pressure (above atmospheric) will be maintained when the cell is in its normal operational state. In its operable state, the cell of the present invention is maintained so that the total void volume of the compressed separator and the active material is not totally filled, yet there is no free electrolyte present.

EXAMPLE

Figure 3:
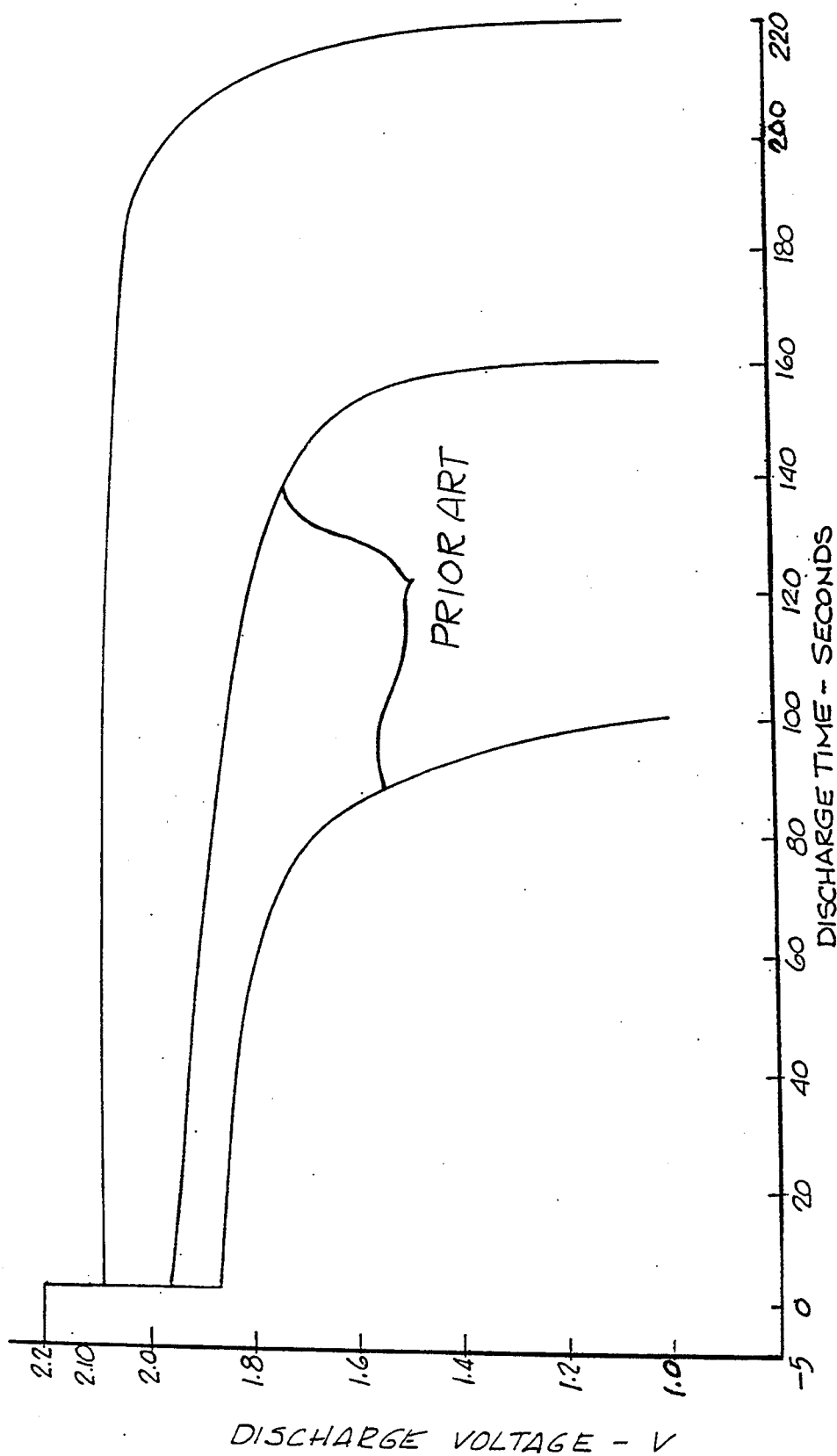
FIG. 3 depicts discharge curves comparing cells of this invention with conventional cells.

As mentioned previously, electrochemical cells produced according to the present invention have distinctly superior discharge and recharge capabilities. FIG. 3 shows the discharge curve for a lead acid electrochemical cell according to the embodiment of the present invention in comparison with discharge curves for the cells described in U.S. Pat. Nos. 3,862,861 of McClelland et al. (the lower line of the two prior art lines) and 4,769,299 of Nelson (the upper line of the two prior art lines). As can be seen, the improved performance is more than just an incremental increase.

The electrochemical cell used to create the discharge curve seen in FIG. 3 has the following characteristics: a non-perforated lead film for both the positive plate and negative plate was composed of 99.50% lead and 0.50% tin; the lead films were 0.002 inches thick and were coated with a layer of 0.002 inches thick of sulfated pastes—the total plate thickness being 0.006 inches; the electrolyte was sulfuric acid with a specific gravity of 1.28; the glass micro-fiber separator was 95% porous in its uncompressed state and contained 90% 1-4 micron diameter fibers and 50% larger fibers up to 1 inch in length and had a specific surface area of less than $2m^2/g$. In a "D" sized electrochemical cell, the lead films would be 45 inches long and 1.5 inches high, and there would be about 26.0 $cm^2$ of surface area for each gram of active material paste.

The cells of the present invention can be recharged at extremely high rates relative to cells currently available. As long as significant overcharging is not allowed, the cells can be recharged at up to 10 C, or ten times the rated capacity of the cell.

What is claimed is:

1. A rechargeable electrochemical cell, comprising: interleafed first and second plates of opposite polarity, the first plate including a film made primarily from lead and a porous electrochemically active paste coated onto both sides of the film, the first plate being less than about 0.01 inches thick and the first plate film being substantially non-perforated and less than about 0.005 inches thick; a polous separator interposed between the first and second plates, the separator having electrolyte in the pores; and a container to contain the plates and separator.

2. The cell of claim 1, wherein the first plate is less than about 0.008 inches thick and the first plate film is less than about 0.003 inches thick.

3. The cell of claim 1, wherein the first plate film is at least about 97% lead.

4. The cell of claim 3, wherein the first plate film is at least about 99.99% lead.

5. The cell of claim 3, wherein the first plate film is about 2.5% tin.

6. The cell of claim 1, wherein the second plate includes a film made primarily from lead and a porous electrochemically active paste coated onto both sides of the film.

7. The cell of claim 6, wherein the second plate is less than about 0.01 inches thick and the second plate film is less than about 0.005 inches thick.

8. The cell of claim 6, wherein the second plate film is substantially non-perforated.

9. The cell of claim 6, wherein the second plate film is perforated.

10. The cell of claim 6, wherein the second plate film is at least about 97% lead.

11. The cell of claim 10, wherein the second plate film is at least about 99.99% lead.

12. The cell of claim 10, wherein the second plate film is about 2.5% tin.

13. The cell of claim 6, wherein the second plate film is not primarily made of lead.

14. The cell of claim 1, wherein said plates and separator are spirally wound whereby the first and second plates are interleafed and separated by the separator.

15. The cell of claim 14, wherein the spiral winding is substantially circular in cross section.

16. A method for manufacturing an electrochemical cell, comprising interleafing first and second plates of opposite polarity separated by a separator, the first plate including a film made primarily from lead and a porous electrochemically active paste coated onto both sides of the film, the first plate being less than about 0.01 inches thick and the first plate film being less than about 0.005 inches thick.

17. The method of claim 16, wherein said first plate and second plate and separator are spirally wound.

18. The method of claim 16, wherein the first plate is less than about 0.008 inches thick and the first plate film is less than about 0.003 inches thick.

19. The method of claim 16, wherein the first plate film is at least about 97% lead.

20. The method of claim 19, wherein the first plate film is at least about 99.99% lead.

21. The method of claim 19, wherein the first plate film is about 2.5% tin.

22. The method of claim 16, wherein the second plate includes a film made primarily from lead with a porous electrochemically active paste coated onto both sides of the film.

23. The method of claim 22, wherein the second plate is less than about 0.01 inches thick and the second plate film is less than about 0.005 inches thick.

24. The method of claim 22, wherein the second plate film is substantially non-perforated.

25. The method of claim 22, wherein the second plate film is perforated.

26. The method of claim 22, wherein the second plate film is at least about 97% lead.

27. The method of claim 26, wherein the second plate film is at least about 99.99% lead.

28. The method of claim 21, wherein the second plate film is about 2.5% tin.

29. The method of claim 21, wherein the second plate film is not primarily made of lead.

30. The method of claim 16, wherein said first plate and second plate and separator are spirally wound whereby the first plate and second plate are interleafed and separated by the separator.

31. The method of claim 30, wherein the spiral winding is substantially circular in cross section.

* * * * *